(12) United States Patent
Ozeki et al.

(10) Patent No.: US 11,437,635 B2
(45) Date of Patent: Sep. 6, 2022

(54) FUEL CELL SYSTEM

(71) Applicant: TOYOTA JIDOSHA KABUSHIKI KAISHA, Toyota (JP)

(72) Inventors: Mahiro Ozeki, Nisshin (JP); Masashi Toida, Nagoya (JP); Hiroaki Mori, Ogaki (JP); Toshiyuki Sanada, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/189,623

(22) Filed: Mar. 2, 2021

(65) Prior Publication Data
US 2021/0376341 A1    Dec. 2, 2021

(30) Foreign Application Priority Data

May 28, 2020    (JP) .............................. JP2020-092982

(51) Int. Cl.
*H01M 8/04*       (2016.01)
*H01M 8/04119*    (2016.01)
*H01M 8/0432*     (2016.01)
*H01M 8/04225*    (2016.01)
*H01M 8/04228*    (2016.01)

(52) U.S. Cl.
CPC ..... *H01M 8/04156* (2013.01); *H01M 8/0432* (2013.01); *H01M 8/04225* (2016.02); *H01M 8/04228* (2016.02)

(58) Field of Classification Search
CPC ......... H01M 8/04156; H01M 8/04225; H01M 8/04228; H01M 8/0432
See application file for complete search history.

(56) References Cited

U.S. PATENT DOCUMENTS

| | | | |
|---|---|---|---|
| 2010/0209791 A1 | 8/2010 | Manabe et al. | |
| 2010/0266911 A1 | 10/2010 | Aso | |
| 2016/0141685 A1* | 5/2016 | Toida | H01M 8/04522 429/444 |
| 2018/0366753 A1* | 12/2018 | Okuyoshi | H01M 8/1007 |

FOREIGN PATENT DOCUMENTS

| JP | 2009032610 A | 2/2009 |
|---|---|---|
| JP | 2009117242 A | 5/2009 |

* cited by examiner

*Primary Examiner* — Olatunji A Godo
(74) *Attorney, Agent, or Firm* — Dickinson Wright, PLLC

(57) ABSTRACT

A fuel cell system includes: a fuel cell that is supplied with a reaction gas to generate electricity; a plurality of auxiliary components used for power generation of the fuel cell; and a control device that causes the fuel cell to generate electricity when a predetermined scavenging start condition is satisfied and controls the auxiliary components using electric power generated by the fuel cell to perform a scavenging process of removing water in a flow path of the reaction gas using the reaction gas, during a stop period in which electric power is not supplied to a load from the fuel cell system.

6 Claims, 4 Drawing Sheets

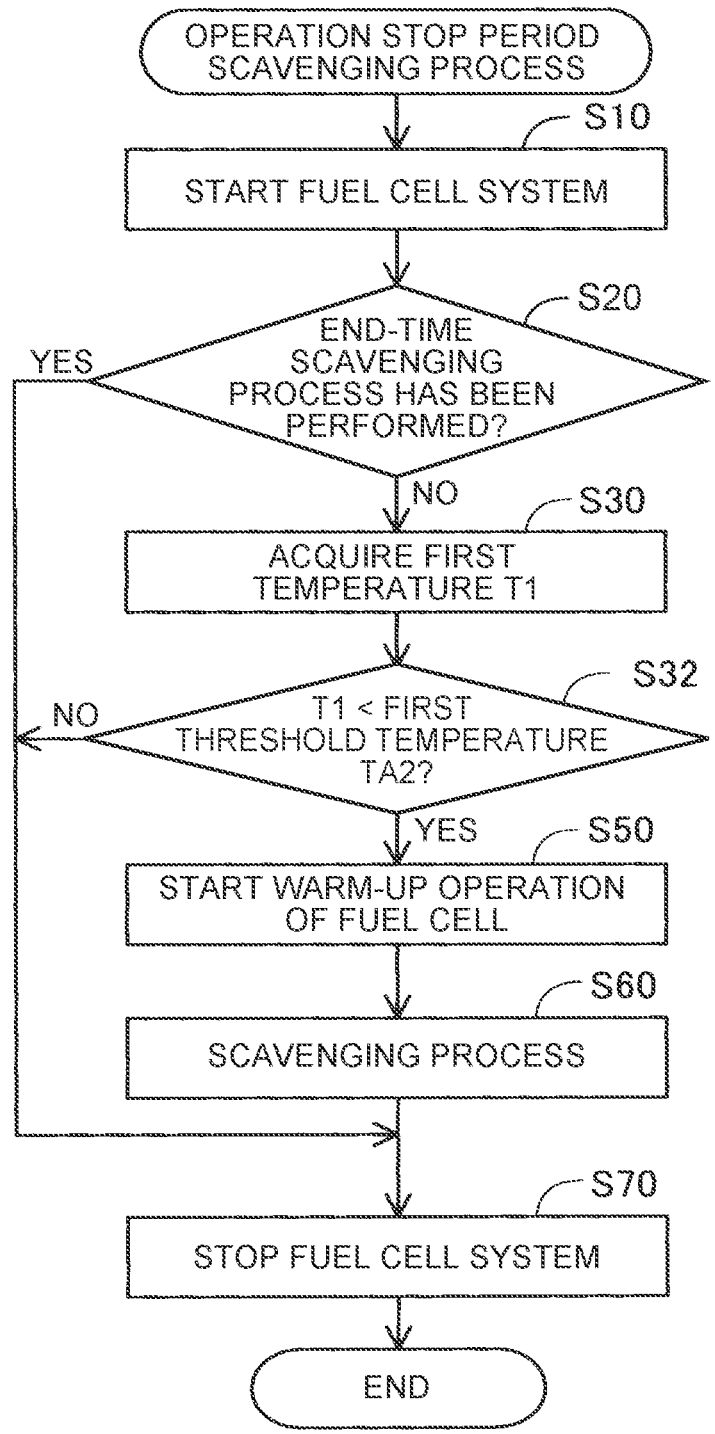

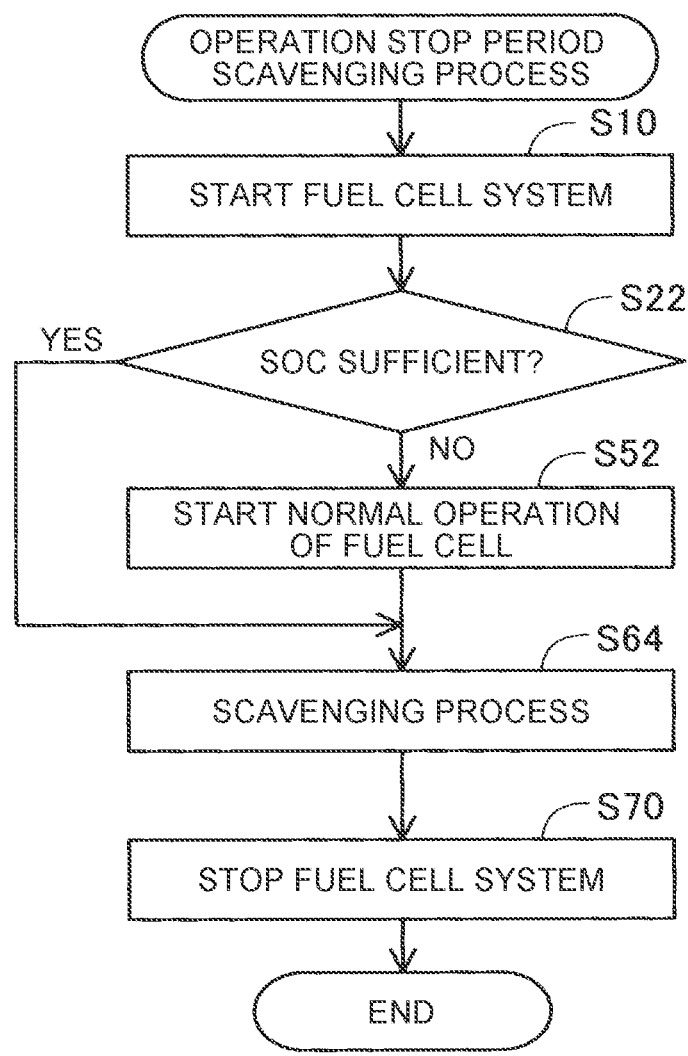

FUEL CELL SYSTEM

CROSS-REFERENCE TO RELATED APPLICATION

This application claims priority to Japanese Patent Application No. 2020-092982 filed on May 28, 2020, incorporated herein by reference in its entirety.

BACKGROUND

1. Technical Field

The present disclosure relates to a fuel cell system.

2. Description of Related Art

A fuel cell system is known that includes a scavenging process execution unit for executing a scavenging process for removing residual water in a gas flow path of a fuel cell with electric power stored in a power storage unit after operation of the fuel cell is stopped (for example, Japanese Unexamined Patent Application Publication No. 2009-117242 (JP 2009-117242 A)).

SUMMARY

In the scavenging process after the operation of the fuel cell is stopped, for example, the period during which the scavenging process can be performed is limited by the amount of electricity stored in the power storage unit, and the residual water in the gas flow path may not be sufficiently removed. Therefore, a technique capable of performing sufficient scavenging process during the stop period of the fuel cell system has been desired.

The present disclosure can be implemented in the following aspects.

(1) An aspect of the present disclosure provides a fuel cell system. The fuel cell system includes: a fuel cell that is supplied with a reaction gas to generate electricity; a plurality of auxiliary components used for power generation of the fuel cell; and a control device that causes the fuel cell to generate electricity when a predetermined scavenging start condition is satisfied and controls the auxiliary components using electric power generated by the fuel cell to perform a scavenging process of removing water in a flow path of the reaction gas using the reaction gas, during a stop period in which electric power is not supplied to a load from the fuel cell system. In the fuel cell system of the above aspect, the control device causes the fuel cell to generate electricity and then controls the auxiliary components to perform a scavenging process, during a stop period of the fuel cell system. Since the auxiliary components are driven with the electric power generated by the fuel cell, the scavenging process during the stop period can be performed without being limited by the charge amount of a secondary battery. Therefore, compared with the scavenging process performed using the electric power of the secondary battery, liquid water in a flow path of the reaction gas and the auxiliary components can be sufficiently discharged, and performance of the scavenging process of the fuel cell system during the stop period can be improved.

(2) The fuel cell system according to the above aspect may further include a first temperature sensor that acquires a first temperature that is a temperature of at least one of the auxiliary components. During the stop period, the control device may acquire the first temperature, and when the acquired first temperature is lower than a predetermined first threshold temperature, may cause the fuel cell to generate electricity to perform the scavenging process. In the fuel cell system of the above aspect, by using the temperature of the auxiliary components as the start condition of the scavenging process, it is possible to perform the scavenging process at a temperature that affects the startability of the auxiliary components. Thus, the performance of the scavenging process of the entire fuel cell system during the stop period can be improved, compared with the case where only the temperature of the fuel cell is used as the start condition of the scavenging process.

(3) In the fuel cell system according to the above aspect, the control device may perform a warm-up operation of the fuel cell with power generation by the fuel cell before the scavenging process. In the fuel cell system of the above aspect, when the first temperature is lower than the first threshold temperature, the control device performs the warm-up operation of the fuel cell and then performs the scavenging process. By raising the temperature of the auxiliary components with the heat generated by the warm-up operation of the fuel cell, it is possible to enhance the scavenging property of the auxiliary components and improve the startability of the fuel cell system.

(4) The fuel cell system according to the above aspect may further include a second temperature sensor that acquires a second temperature that is a temperature of the fuel cell. In a case where the first temperature is lower than the first threshold temperature, the control device may perform a warm-up operation of the fuel cell with power generation by the fuel cell before the scavenging process when the second temperature is lower than a predetermined second threshold temperature, and may cause the fuel cell to generate electricity to perform the scavenging process without performing the warm-up operation when the second temperature is equal to or higher than the second threshold temperature. In the fuel cell system of the above aspect, the temperature of the fuel cell can be raised by the warm-up operation and the scavenging process can be performed in a higher temperature environment, the performance of the scavenging process during the stop period can be further improved.

(5) In the fuel cell system according to the above aspect, the second threshold temperature may be set to a temperature lower than the first threshold temperature. In the fuel cell system of the above aspect, by setting the start condition of the scavenging process for the fuel cell, which has higher startability in a low temperature environment than the auxiliary components, at a lower temperature than the start condition of the scavenging process for the auxiliary components, it is possible to suppress unnecessary fuel gas consumption.

(6) In the fuel cell system according to the above aspect, the first temperature may be a temperature of an auxiliary component, out of the auxiliary components, exhibiting a lower temperature than the fuel cell during the stop period. In the fuel cell system of the above aspect, the auxiliary components from which the first temperature is acquired are limited to the auxiliary components that tend to exhibit a low temperature to suppress increase in the number of the first temperature sensors, so that the start condition of the scavenging process can be efficiently determined.

(7) In the fuel cell system according to the above aspect, the auxiliary components may include at least one of a gas-liquid separator for separating liquid water contained in the reaction gas consumed by the fuel cell and a circulation pump for circulating the reaction gas to the fuel cell; and the first temperature may be a temperature of the gas-liquid separator or the circulation pump. By using the temperature of the gas-liquid separator and the circulation pump, which tend to exhibit the lowest temperature among the auxiliary components of the fuel cell system, to determine the start condition of the scavenging process, the auxiliary components from which the first temperature is acquired can be further limited and the start condition of the scavenging process can be determined more efficiently.

The present disclosure can be realized in various forms other than the above, for example, a vehicle equipped with a fuel cell system, a method for controlling a fuel cell system, a method for determining necessity of a scavenging process, a computer program for realizing these methods, a storage medium that stores such a computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a flowchart showing an operation stop period scavenging process of a second embodiment; and FIG. 4 is a flowchart showing an operation stop period scavenging process of a third embodiment.

DETAILED DESCRIPTION OF EMBODIMENTS

A. First Embodiment

Figure 1:
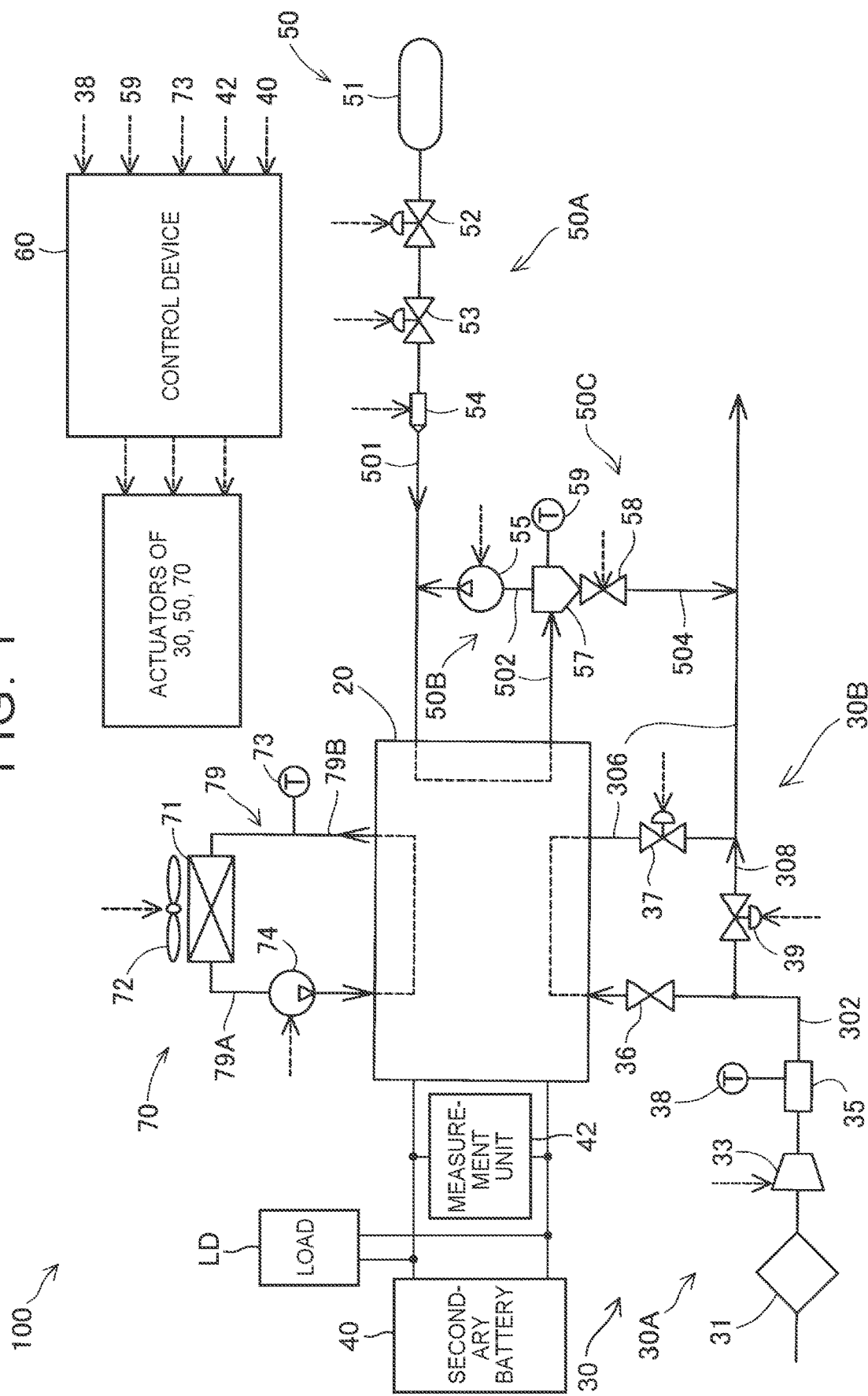
FIG. 1 is an explanatory diagram showing a configuration of a fuel cell system according to a first embodiment.

FIG. 1 is a schematic view showing a configuration of a fuel cell system 100 according to a present embodiment. The fuel cell system 100 is mounted on, for example, a fuel cell vehicle using the fuel cell 20 as a drive source. The fuel cell system 100 uses electric power generated by the fuel cell 20 to drive various devices included in a load LD. The fuel cell system 100 includes the fuel cell 20, a secondary battery 40, a control device 60, an oxidation gas supply/discharge system 30, a fuel gas supply/discharge system 50, and a refrigerant circulation system 70.

The fuel cell 20 has a stack structure in which a plurality of cells each having a membrane electrode assembly (MEA) in which an anode and a cathode are bonded to the opposite sides of an electrolyte membrane. The fuel cell 20 is a polymer electrolyte fuel cell that generates electricity by being supplied with, as reaction gases, hydrogen gas serving as a fuel gas and air serving as an oxidation gas, and drives the load LD using the generated electric power. The load LD includes, for example, a drive motor that generates a driving force of the fuel cell vehicle, a heater used for air conditioning in the fuel cell vehicle, and the like. The fuel cell 20 is not limited to the fuel cell of a solid polymer type, and may be a fuel cell of various types such as a phosphoric acid type, a molten carbonate type, and a solid oxide type. The fuel cell system 100 may be used not only for a fuel cell vehicle but also for a household power source, a stationary power generation, and the like.

In the present embodiment, an impedance measurement unit 42 is connected to the fuel cell 20. The impedance measurement unit 42 acquires the amount of water in the fuel cell 20. More specifically, the impedance measurement unit 42 applies an alternating current to the fuel cell 20 in an operating state, and calculates the impedance of the fuel cell 20 using the alternating current impedance method. The impedance measurement unit 42 derives the water content of the fuel cell 20 from the acquired impedance, using the correspondence map between the preset impedance of the fuel cell 20 and the water content of the fuel cell 20. The measurement result by the impedance measurement unit 42 is transmitted to the control device 60. When the water content of the fuel cell 20 is not used for the start condition and the end condition of the scavenging process described later, the impedance measurement unit 42 need not be provided.

The secondary battery 40 functions as a power source for the load LD together with the fuel cell 20. The secondary battery 40 is, for example, a high voltage secondary battery having an output voltage of 200 V to 400 V. As the secondary battery 40, for example, a nickel metal hydride battery, a lithium ion battery, and the like can be used. For the secondary battery 40, a low voltage secondary battery such as a lead storage battery having an output voltage of about 10 V to 30 V may be mounted as a power source for the control device 60 and the like. A direct current-direct current (DC-DC) converter (not shown) for controlling charging/discharging of the secondary battery 40 is disposed between the secondary battery 40 and the fuel cell 20. The DC-DC converter measures a state of charge (SOC: remaining capacity) of the secondary battery 40 and transmits the SOC to the control device 60. An inverter may be provided between the fuel cell 20 and the load LD to convert the direct current power supplied from the secondary battery 40 or the fuel cell 20 into alternating current power such as a three-phase alternative current.

The control device 60 includes a microcomputer having a microprocessor that executes logical operations, a memory such as a read only memory (ROM) and a random access memory (RAM), and the like. The microprocessor executes programs stored in the memory so that the control device 60 performs various controls of fuel cell system 100 that include power generation of the fuel cell 20 and drive control of a plurality of auxiliary components used for a scavenging process. The "scavenging process" means a process of removing water in the flow path of the reaction gas and the auxiliary components by driving the auxiliary components to flow the reaction gas. In the present embodiment, the scavenging process includes both a scavenging process on the anode side and a scavenging process on the cathode side. The anode side includes an anode-side flow path of the fuel cell 20 and the cathode side includes a cathode-side flow path of the fuel cell 20. Only one of the scavenging process on the anode side and the scavenging process on the cathode side may be performed. The "auxiliary components used for the scavenging process" are auxiliary components also used for power generation of the fuel cell 20. For example, the auxiliary parts used for the scavenging process include valves and pipes included in the oxidation gas supply/discharge system 30, the fuel gas supply/discharge system 50, an injector 54, a circulation pump 55, a gas-liquid separator 57, an air compressor 33, intercooler 35 and the like. When only one of the scavenging process on the anode side and the scavenging process on the cathode side is performed by the control device 60, the auxiliary components used for the scavenging process means the auxiliary components that performs the one scavenging process. In general, the scavenging process is more effective as it is performed in a higher temperature environment, from the viewpoint of discharging liquid water. Therefore, it is preferable that the auxiliary components be thermally coupled to the fuel cell 20, and for example, be configured such that the temperature thereof can increase as the temperature of the fuel cell 20 increases. The thermal coupling with the fuel cell 20 can be realized by connection with the fuel cell 20 via a cooling system for circulating a refrigerant such as the refrigerant circulation system 70, members including a heat pipe, a heat pump, a conduit, and the like, arrangement together with the fuel cell 20 in the same space, and the like. The valves, the injector 54, the air compressor 33, the circulation pump 55, and the refrigerant circulation pump 74 may be included in the load LD described above.

The fuel gas supply/discharge system 50 includes a fuel gas supply system 50A having an anode gas supply function, a fuel gas discharge system 50C having an anode gas discharge function, and a fuel gas circulation system 50B having an anode gas circulation function. The anode gas supply function means a function of supplying an anode gas containing a fuel gas to the anode of the fuel cell 20. The anode gas discharge function means a function of discharging an anode off gas, which is the exhaust gas discharged from the anode of the fuel cell 20, to the outside. The anode gas circulation function means a function of circulating hydrogen contained in the anode off gas in the fuel cell system 100.

The fuel gas supply system 50A supplies the anode gas containing hydrogen to the anode of the fuel cell 20. The fuel gas supply system 50A includes an anode supply pipe 501, a fuel gas tank 51, an on-off valve 52, a regulator 53, and an injector 54.

The anode supply pipe 501 is a conduit connecting the fuel gas tank 51, which is a hydrogen supply source, and an inlet of the anode of the fuel cell 20, and guides the anode gas to the fuel cell 20. The on-off valve 52 is provided in a position near the fuel gas tank 51 in the anode supply pipe 501. The on-off valve 52 is also referred to as a main stop valve and allows hydrogen in the fuel gas tank 51 to flow downstream in the valve open state. The regulator 53 is provided on the fuel cell 20 side (downstream side) of the on-off valve 52 in the anode supply pipe 501. The regulator 53 adjusts the pressure of hydrogen on the upstream side of the injector 54 through control by the control device 60.

The injector 54 is provided on the downstream side of the regulator 53 in the anode supply pipe 501. The injector 54 is an on-off valve that is controlled by the control device 60 and is electromagnetically driven in accordance with a set drive cycle and valve opening time. The injector 54 adjusts the amount of hydrogen in the anode gas supplied to the fuel cell 20.

The fuel gas circulation system 50B circulates the anode off gas discharged from the anode of the fuel cell 20 to the anode supply pipe 501 after separating the liquid components. The fuel gas circulation system 50B includes an anode circulation pipe 502, the gas-liquid separator 57, the circulation pump 55, and a separator temperature sensor 59.

The anode circulation pipe 502 is connected to the anode outlet of the fuel cell 20 and the anode supply pipe 501, and guides the anode off gas discharged from the anode to the anode supply pipe 501. The gas-liquid separator 57 is provided in the anode circulation pipe 502 and separates a liquid component containing water vapor from the anode off gas to store the liquid component. The circulation pump 55 is provided between the gas-liquid separator 57 and the anode supply pipe 501 in the anode circulation pipe 502. The circulation pump 55 functions as an anode gas circulation device that sends the anode off gas flowing into the gas-liquid separator 57 to the anode supply pipe 501.

The separator temperature sensor 59 acquires the temperature of the gas-liquid separator 57. The measurement result by the separator temperature sensor 59 is transmitted to the control device 60. In the present embodiment, heat is not transferred to the gas-liquid separator 57 from the fuel cell 20 during the stop period, and the gas-liquid separator 57 exhibits a lower temperature than the fuel cell 20 due to the influence of the outside temperature, and exhibits the lowest temperature among the auxiliary components included in the fuel cell system 100. The "auxiliary component exhibiting a lower temperature than the fuel cell 20 among the auxiliary components" means an auxiliary component that is used for the scavenging process and exhibits a temperature acquired at a point in the stop period, which tends to be lower than the temperature of the fuel cell 20, among the auxiliary components whose temperatures can be directly or indirectly acquired by the fuel cell system 100. The "auxiliary component exhibiting the lowest temperature among the auxiliary components" means an auxiliary component used for the scavenging process and exhibits a temperature acquired at a point in the stop period, which tends to be the lowest, among the auxiliary components whose temperatures can be directly or indirectly acquired by the fuel cell system 100. The temperature of the auxiliary component used for the scavenging process is also referred to as "first temperature", and the temperature sensor for acquiring the temperature of the auxiliary component is also referred to as "first temperature sensor" below. The temperature of the gas-liquid separator 57 corresponds to the "first temperature", and the separator temperature sensor 59 corresponds to the "first temperature sensor". Among the auxiliary components used for the scavenging process, at least one auxiliary component is sufficient for the auxiliary component from which the first temperature is acquired, which may be, for example, the circulation pump 55, besides the gas-liquid separator 57. The temperature of two or more auxiliary components or all the auxiliary components of the fuel cell system 100 may be acquired as the first temperature. For the first temperature, when the temperatures of the auxiliary components are acquired, the lowest value among the acquired temperatures of the auxiliary components may be used, or the average value of the acquired temperatures of the auxiliary components may be used. The auxiliary components from which the first temperature is acquired may be preset based on the results of tests and the like, and may be appropriately changed based on the acquisition results of the temperature of the auxiliary components provided in the fuel cell system 100. The temperature of the auxiliary component is not limited to the temperature of the auxiliary component itself. The temperature of the auxiliary component may be the temperature of the auxiliary component indirectly acquired using the temperature near the auxiliary component, and may be an estimated value of the temperature of the auxiliary component that is calculated using the temperature other than the temperature of the auxiliary component. For example, the temperature of the gas-liquid separator 57 is not limited to the temperature of the gas-liquid separator 57 itself. The temperature of the gas-liquid separator 57 may be indirectly acquired using the temperature of the anode off gas or the liquid water flowing inside the gas-liquid separator 57, the temperature of the anode circulation pipe 502 or the anode discharge pipe 504 near the gas-liquid separator 57, or the temperature of the liquid water or gas inside the anode circulation pipe 502 or the anode discharge pipe 504. Alternatively, the temperature of the gas-liquid separator 57 may be an estimated value of the temperature of the gas-liquid separator 57 that is calculated using these temperatures. When the temperature of the auxiliary component is, for example, below the freezing point, freezing of the auxiliary component or the liquid water in the auxiliary component may affect the start of the auxiliary component.

The fuel gas discharge system 50C discharges the anode off gas and the liquid water stored in the gas-liquid separator 57 to the exhaust gas pipe 306. The fuel gas discharge system 50C has the anode discharge pipe 504 and an exhaust drain valve 58. The anode discharge pipe 504 is a conduit connecting the discharge port of the gas-liquid separator 57 and the exhaust gas pipe 306, and discharges the drain from the gas-liquid separator 57 and a part of the anode off gas passing through the gas-liquid separator 57 from the fuel gas supply/discharge system 50. The exhaust drain valve 58 is provided in the anode discharge pipe 504 and opens and closes the flow path of the anode discharge pipe 504. As the exhaust drain valve 58, for example, a diaphragm valve can be used. When the exhaust drain valve 58 is opened, the liquid water and the anode off gas stored in the gas-liquid separator 57 are discharged to the atmosphere through the exhaust gas pipe 306.

The oxidation gas supply/discharge system 30 includes an oxidation gas supply system 30A having a cathode gas supply function and an oxidation gas discharge system 30B having a cathode gas discharge function and a cathode gas bypass function. The cathode gas supply function means a function of supplying air containing oxygen as a cathode gas to the cathode of the fuel cell 20. The cathode gas discharge function means a function of discharging a cathode off gas, which is the exhaust gas discharged from the cathode of the fuel cell 20, to the outside. The cathode gas bypass function means a function of discharging a part of the supplied cathode gas to the outside without supplying it to the fuel cell 20.

The oxidation gas supply system 30A supplies air serving as a cathode gas to the cathode of the fuel cell 20. The oxidation gas supply system 30A includes a cathode supply pipe 302, an air cleaner 31, an air compressor 33, the intercooler 35, an intercooler (IC) temperature sensor 38, and an inlet valve 36.

The cathode supply pipe 302 is a conduit connected to the inlet of the cathode of the fuel cell 20, and is an air supply flow path for the cathode of the fuel cell 20. The air cleaner 31 is provided at a position in the cathode supply pipe 302, which is on the air introduction port side (upstream side) of the air compressor 33, and removes foreign matter in the air that is supplied to the fuel cell 20. An outside air temperature sensor that measures the temperature of the outside air may be provided on the upstream side of the air cleaner 31.

The air compressor 33 is provided at a position in the cathode supply pipe 302, which is on the upstream side of the fuel cell 20. The air compressor 33 compresses the air taken in through the air cleaner 31 and sends it out to the cathode. As the air compressor 33, for example, a turbo compressor is used. The drive of the air compressor 33 is controlled by the control device 60.

The intercooler 35 is provided at a position in the cathode supply pipe 302, which is between the air compressor 33 and the fuel cell 20. The intercooler 35 cools the air compressed and heated by the air compressor 33. The method for cooling the cathode gas can be realized, for example, by circulating the refrigerant of the refrigerant circulation system 70 in the intercooler 35.

The IC temperature sensor 38 acquires the temperature of the intercooler 35. Since the intercooler 35 is generally provided near the introduction port of the outside air, the temperature tends to decrease due to the influence of the outside air temperature. In the present embodiment, the intercooler 35 exhibits a temperature lower than that of the fuel cell 20 during the stop period, and indicates the lowest temperature among the auxiliary components for performing the scavenging process on the cathode side. In the present embodiment, the temperature of the intercooler 35 corresponds to the "first temperature", and the IC temperature sensor 38 corresponds to the "first temperature sensor". The temperature of the intercooler 35 is not limited to the temperature of the intercooler 35 itself. For the temperature of the intercooler 35, the temperature of the air flowing inside the intercooler 35, the temperature of the cathode supply pipe 302 near the intercooler 35, or the temperature of the refrigerant circulating in the intercooler 35 may be used. Alternatively, the temperature of the intercooler 35 may be an estimated value of the temperature of the intercooler 35 that is calculated using these temperatures. The measurement result of the temperature of the intercooler 35 by the IC temperature sensor 38 is transmitted to the control device 60.

The inlet valve 36 controls the inflow of cathode gas into the cathode of the fuel cell 20. The inlet valve 36 is an on-off valve that opens mechanically when a cathode gas having a predetermined pressure flows in.

The oxidation gas discharge system 30B has a cathode off gas discharge function, and includes the exhaust gas pipe 306 and a bypass pipe 308. The exhaust gas pipe 306 is a cathode off gas discharge flow path connected to the outlet of the cathode of the fuel cell 20. The exhaust gas pipe 306 guides the exhaust gas of the fuel cell 20 containing the cathode off gas into the atmosphere. The exhaust gas discharged to the atmosphere from the exhaust gas pipe 306 contains the anode off gas and the air flowing out from the bypass pipe 308 in addition to the cathode off gas.

The exhaust gas pipe 306 is provided with an outlet valve 37. The outlet valve 37 is disposed at a position in the exhaust gas pipe 306, which is on the fuel cell 20 side of the connecting position of the exhaust gas pipe 306 with the bypass pipe 308. As the outlet valve 37, for example, a solenoid valve or an electric valve can be used. The control device 60 adjusts the back pressure of the cathode of the fuel cell 20 by adjusting the opening degree of the outlet valve 37.

The bypass pipe 308 is a conduit connecting the cathode supply pipe 302 and the exhaust gas pipe 306 bypassing the fuel cell 20. The bypass pipe 308 is provided with a bypass valve 39. As the bypass valve 39, for example, a solenoid valve or an electric valve can be used. When the bypass valve 39 is opened, a part of the cathode gas flowing through the cathode supply pipe 302 flows into the exhaust gas pipe 306. The control device 60 adjusts the flow rate of the cathode gas flowing into the bypass pipe 308 by adjusting the opening degree of the bypass valve 39.

The refrigerant circulation system 70 circulates the refrigerant in the fuel cell 20 to adjust the temperature of the fuel cell 20. As the refrigerant, for example, an antifreeze liquid such as ethylene glycol or water is used. The refrigerant circulation system 70 includes a refrigerant circulation path 79, a refrigerant circulation pump 74, a radiator 71, a radiator fan 72, and a fuel cell temperature sensor 73.

The refrigerant circulation path 79 has a refrigerant supply path 79A for supplying the refrigerant to the fuel cell 20 and a refrigerant discharge path 79B for discharging the refrigerant from the fuel cell 20. The refrigerant circulation pump 74 sends the refrigerant in the refrigerant supply path 79A to the fuel cell 20. The radiator 71 receives the wind from the radiator fan 72, dissipates heat, and cools the refrigerant circulating inside.

The fuel cell temperature sensor 73 acquires the temperature of the fuel cell 20. The temperature of the fuel cell 20 is not limited to the temperature of the fuel cell 20 itself. The temperature of the fuel cell 20 may be the temperature of the auxiliary components near the fuel cell 20, or an estimated value of the temperature of the fuel cell 20 such as a calculated value. In the present embodiment, the fuel cell temperature sensor 73 acquires the temperature of the refrigerant in the refrigerant discharge path 79B as the temperature of the fuel cell 20. Hereinafter, the temperature of the fuel cell 20 is also referred to as "second temperature", and the temperature sensor that acquires the temperature of the fuel cell 20 is also referred to as "second temperature sensor". The temperature of the refrigerant in the refrigerant discharge path 79B corresponds to the second temperature, and the fuel cell temperature sensor 73 corresponds to the second temperature sensor. The measurement result by the fuel cell temperature sensor 73 is transmitted to the control device 60.

Figure 2:
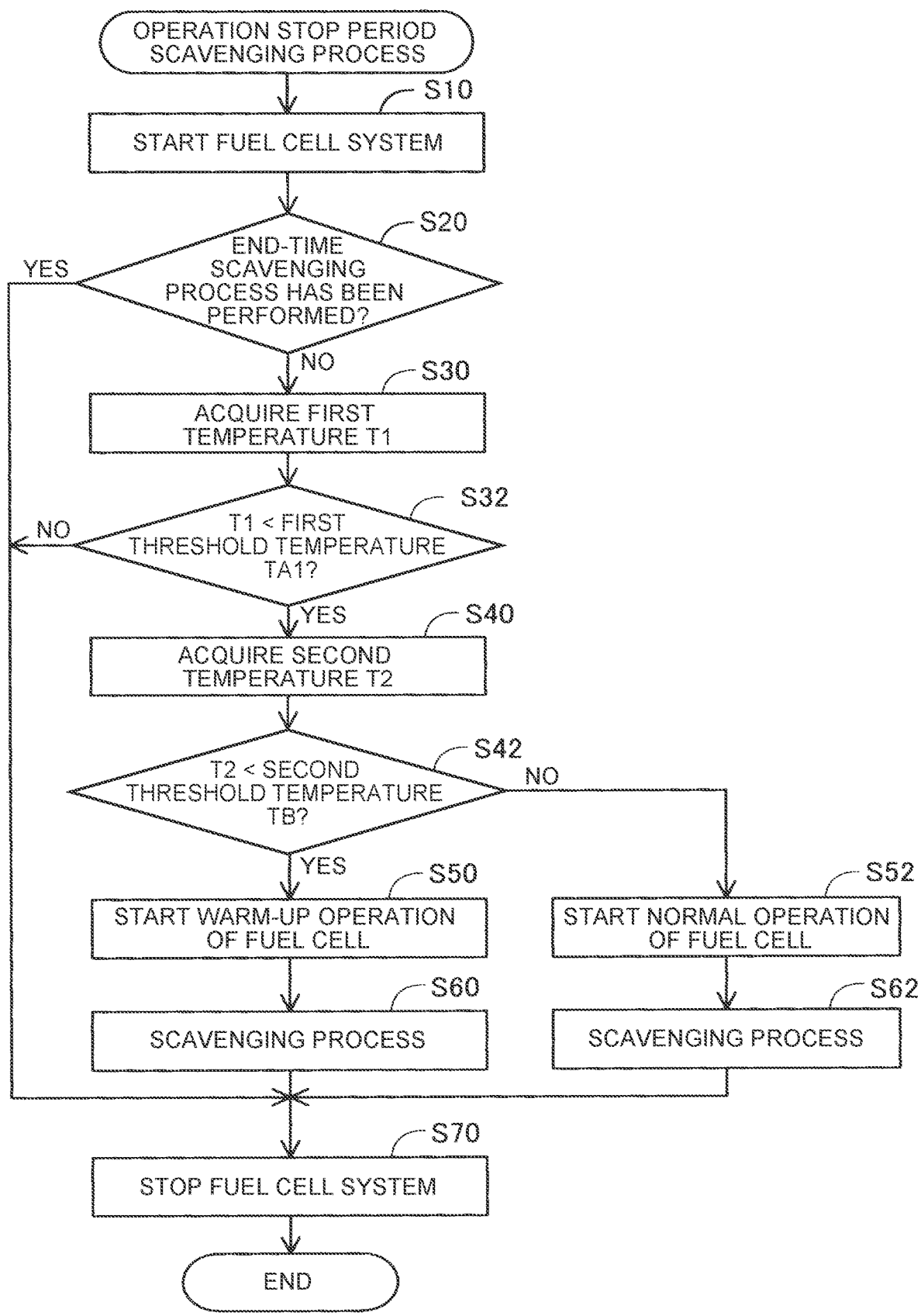
FIG. 2 is a flowchart showing an operation stop period scavenging process performed by a control device.

FIG. 2 is a flowchart showing an operation stop period scavenging process performed by the control device 60 included in the fuel cell system 100 according to the first embodiment. This flow starts, for example, when the fuel cell vehicle equipped with the fuel cell system 100 is switched off and the fuel cell system 100 stops operating. The period during which the fuel cell system 100 is stopped and the load LD is not supplied with electric power is hereinafter referred to as "stop period". The stop period is also referred to as an operation stop period or a soak period. The flow may be repeatedly performed at predetermined cycles during the stop period. When a certain period of time has elapsed from the start of the stop period, the control device 60 starts the fuel cell system 100 using the electric power from the secondary battery 40 (step S10). In step S10, the control device 60 may start only a part of the fuel cell system 100 that is required for each process of the flow, such as the first temperature sensor and the second temperature sensor.

The control device 60 confirms whether the scavenging process (hereinafter, also referred to as "end-time scavenging process") was performed at the time of stoppage of the operation of the fuel cell system 100 (step S20). The wording "at the time of stoppage of the fuel cell system 100" means the time when the preparation for ending the operation of the fuel cell system 100 is started by the command of the user or the control device 60, and means a stage after the fuel cell system 100 completely stops operating and before the start of the stop period. When the end-time scavenging process has been performed (S20: YES), the control device 60 stops the operation of the fuel cell system 100 (step S70), and ends the process. In the fuel cell system 100 of the present embodiment, when the end-time scavenging process has been performed, the scavenging process during the operation stop period is omitted, so that power consumption during the stop period can be reduced. Note that step S20 may be omitted in order to reliably perform the scavenging process during the stop period of the fuel cell system 100.

When the control device 60 determines that the end-time scavenging process has not been performed (S20: NO), the control device 60 acquires the first temperature. In the present embodiment, the control device 60 acquires, as a first temperature T1, the measurement result of the temperature of the gas-liquid separator 57 acquired from the separator temperature sensor 59 and the measurement result of the temperature of the intercooler 35 acquired from the IC temperature sensor 38 (step S30). When only one of the scavenging process on the anode side and the scavenging process on the cathode side has been performed, the temperature of one of the gas-liquid separator 57 and the intercooler 35 may be acquired. The control device 60 determines whether the acquired first temperature T1 is lower than a predetermined first threshold temperature TA1 (step S32). The first threshold temperature TA1 can be appropriately set using a temperature sufficient to allow the auxiliary components to be normally driven without performing the scavenging process. The first threshold temperature TA1 is preferably close to the freezing point in order to avoid freezing of the liquid water. In the present embodiment, the first threshold temperature TA1 is set at the freezing point from the viewpoint of avoiding freezing of the liquid water flowing inside the gas-liquid separator 57 used for the scavenging process. The first threshold temperature TA1 may be set at a temperature lower than the freezing point, when the auxiliary components can be started normally at a temperature lower than the freezing point. The first threshold temperature TA1 is not limited to the freezing point or below the freezing point, and may be set at a temperature higher than the freezing point. The first threshold temperature TA1 is preferably set within a temperature range of, for example, −10° C. to 5° C. When there is a difference in startability in a low temperature environment between the auxiliary components on the anode side and the auxiliary components on the cathode side, the first threshold temperature TA1 may be set to be different between the auxiliary components on the anode side and the auxiliary components on the cathode side In the present embodiment, when the temperature of all the auxiliary components is the first temperature T1 and the temperature of the gas-liquid separator 57 and the temperature of the intercooler 35 are both equal to or higher than the freezing point, the control device 60 determines that the first temperature T1 is equal to or higher than the first threshold temperature TA1. When the first temperature T1 is equal to or higher than the first threshold temperature TA1 (S32: NO), the control device 60 stops the operation of the fuel cell system 100 (step S70), and ends the process. In step S32, for comparison with the first threshold temperature TA1, the control device 60 may use, for example, the lower one of the temperature of the gas-liquid separator 57 and the temperature of the intercooler 35 as the first temperature T1, or may use the average value of the temperature of the gas-liquid separator 57 and the temperature of the intercooler 35 as the first temperature T1.

When the first temperature T1 is lower than the first threshold temperature TA1 (S32: YES), the control device 60 acquires the second temperature. More specifically, the control device 60 acquires as the second temperature T2 the temperature of the fuel cell 20 that is acquired from the fuel cell temperature sensor 73 (step S40). The control device 60 determines whether the acquired second temperature T2 is lower than a predetermined second threshold temperature TB (step S42). The second threshold temperature TB can be appropriately set using a temperature sufficient to allow the fuel cell 20 to normally start power generation without performing the scavenging process. The second threshold temperature TB is preferably close to the freezing point, for example, in order to avoid blockage in the reaction gas flow path due to the generated water of the fuel cell 20. The fuel cell 20 has higher startability in a low temperature environment than the auxiliary components, and the threshold temperature serving as a start condition of the scavenging process can be set lower than that of the auxiliary components. The second threshold temperature TB is preferably set within a temperature range of, for example, −20° C. to 5° C. In the present embodiment, the second threshold temperature TB is set to −10° C. that is a temperature lower than the first threshold temperature TA1 due to the difference in startability in a low temperature environment between the fuel cell 20 and the auxiliary components. When there is no difference in startability between the fuel cell 20 and the auxiliary components, the second threshold temperature TB may be set to the same temperature as the first threshold temperature TA1. The second threshold temperature TB is not limited to the temperature equal to or lower than the first threshold temperature TA1, and may be set to a temperature higher than the first threshold temperature TA1.

When the second temperature T2 is lower than the second threshold temperature TB (S42: YES), the control device 60 uses the electric power of the secondary battery 40 to drive the auxiliary components to start power generation of the fuel cell 20, and starts the warm-up operation of the fuel cell 20 with power generation of the fuel cell 20 (step S50). More specifically, the control device 60 controls the oxidation gas supply/discharge system 30 and the fuel gas supply/discharge system 50 such that the stoichiometric ratio of the oxidation gas supplied to the fuel cell 20 is smaller than that in normal operation. The "stoichiometric ratio of the oxidation gas" means the ratio of the actual supply amount of the oxidation gas to the theoretical value of the amount of oxidation gas necessary to generate the required power. Through this control, the concentration overvoltage at the cathode increases and the power generation efficiency of the fuel cell 20 decreases, so that the amount of heat generation of the fuel cell 20 increases as compared with the normal operation. Thus, the temperature rise rate of the fuel cell 20 can be increased. The stoichiometric ratio of the oxidation gas in the warm-up operation can be set to, for example, about 1.0. The control device 60 controls the current of the fuel cell 20 while supplying the reaction gas to the fuel cell 20 at a stoichiometric ratio for warm-up operation, to cause the fuel cell 20 to generate electricity such that the fuel cell 20 generates heat with a target amount of heat generation. The control device 60 may set the target amount of heat generation to a larger value as the current outside air temperature, the first temperature, and the second temperature are lower.

After the warm-up operation is performed, the control device 60 drives the auxiliary components using the electric power generated by the fuel cell 20 to perform the scavenging process (step S60). More specifically, the control device 60 drives the circulation pump 55 in a state where the drive of the injector 54 is stopped, and uses the gas component of the exhaust gas separated by the gas-liquid separator 57 as a scavenging gas to cause the gas component to circulate between the fuel gas circulation system 50B and the fuel cell 20 as well as appropriately opens the exhaust drain valve 58, thereby performing the scavenging process on the anode side. The circulation of the gas component of the exhaust gas scavenges the flow path of the fuel gas which includes the anode circulation pipe 502 and the flow path in the fuel cell 20. In the present embodiment, the control device 60 drives the air compressor 33 as the scavenging process on the cathode side in addition to the scavenging process on the anode side of the fuel cell 20, thereby scavenging the flow path of the oxidation gas which includes the flow path on the cathode side in the fuel cell 20.

When the completion condition of the scavenging process is satisfied, the control device 60 ends the scavenging process and stops the fuel cell system 100 (step S70) to complete the process. In the present embodiment, the control device 60 determines that the completion condition of the scavenging process is satisfied when the water content of the fuel cell 20 acquired from the impedance measurement unit 42 falls below a predetermined threshold value. Other examples of the completion condition for the scavenging process include, for example, a case where scavenging is continued for a predetermined period of time and a case where the wetness of the scavenging gas discharged from the fuel cell 20 drops below a predetermined threshold.

When the second temperature T2 is equal to or higher than the second threshold temperature TB (S42: NO), the control device 60 starts power generation of the fuel cell 20 and starts normal operation of the fuel cell 20 (step S52). The control device 60 uses the electric power generated by the fuel cell 20 to drive the auxiliary components to perform the scavenging process (step S62). The control of the scavenging process may be the same as that of step S60, and may be a control under different conditions such as a shortened scavenging time in order to efficiently perform the scavenging process. When the completion condition of the scavenging process is satisfied, the control device 60 ends the scavenging process and stops the fuel cell system 100 (step S70) to complete the process.

As described above, in the fuel cell system 100 of the present embodiment, the control device 60 performs the scavenging process by controlling the auxiliary components after causing the fuel cell 20 to generate electricity during the stop period from the time when the fuel cell system 100 is stopped to the time when the fuel cell system 100 is started. Since the auxiliary components are driven with the electric power generated by the fuel cell 20, the scavenging process can be performed without being limited by the charge amount of the secondary battery 40. The period of the scavenging process can be set longer than the period of the scavenging process performed using the electric power of the secondary battery 40. Thus, the liquid water in the reaction gas flow path and the auxiliary components can be sufficiently discharged, and the performance of the scavenging process of the fuel cell system 100 during the stop period can be improved. In the fuel cell system 100 of the present embodiment, the fuel cell 20 is caused to generate electricity before the start of the scavenging process. Therefore, the temperature of the fuel cell 20 and the auxiliary components can be raised. Thus, the scavenging process can be performed in a higher temperature environment than the scavenging process performed using the electric power of the secondary battery 40, and the performance of the scavenging process during the stop period can be improved. In the fuel cell system 100 of the present embodiment, the fuel cell 20 is caused to generate electricity to put the fuel cell 20 into an operating state, so that the impedance of the fuel cell 20 can be measured and the water content of the fuel cell 20 can be obtained. Therefore, the accuracy of determining the completion condition of the scavenging process can be improved and the performance of the scavenging process during the stop period can be improved, compared with the scavenging process performed using the electric power of the secondary battery 40.

The fuel cell system 100 of the present embodiment further includes the first temperature sensor that acquires the first temperature T1 that is the temperature of the auxiliary components. The control device 60 performs the scavenging process when the first temperature T1 is lower than the predetermined first threshold temperature TA1. Using the temperature of the auxiliary components as the start condition of the scavenging process, the scavenging process can be performed at a temperature that affects the startability of the auxiliary components. Thus, the performance of the scavenging process of the entire fuel cell system 100 during the stop period can be improved, compared with the case where only the temperature of the fuel cell 20 is used as the start condition of the scavenging process. According to the fuel cell system 100 of the present embodiment, for example, by setting the start condition of the scavenging process to a temperature condition such as being below the freezing point where the liquid water is likely to freeze and the scavenging process is more effective, the scavenging process during the stop period can be performed efficiently.

The fuel cell system 100 of the present embodiment further includes the second temperature sensor that acquires the second temperature T2 that is the temperature of the fuel cell 20. When the first temperature T1 is lower than the first threshold temperature TA1 and the second temperature T2 is lower than the second threshold temperature TB, the control device 60 performs the warm-up operation of the fuel cell 20 and then performs the scavenging process. Since the temperature of the fuel cell 20 can be raised by the warm-up operation and the scavenging process can be performed in a higher temperature environment, the performance of the scavenging process during the stop period can be further improved. When the auxiliary components each have a thermal bond with the fuel cell 20, the scavenging property of the auxiliary components can be improved by raising the temperature of the auxiliary components with heat generated by the warm-up operation of the fuel cell 20. Thus, the startability of the fuel cell system 100 as a whole can be improved. Further, in the fuel cell system 100 of the present embodiment, the control device 60 performs the scavenging process without performing the warm-up operation, when the first temperature T1 is lower than the first threshold temperature TA1 and the second temperature T2 is equal to or higher than the second threshold temperature TB. The start condition of the warm-up operation is limited to the condition in which both the first temperature T1 and the second temperature T2 are low and the warm-up operation is particularly effective, so that unnecessary fuel gas consumption can be suppressed.

According to the fuel cell system 100 of the present embodiment, the second threshold temperature TB is set at −10° C., which is lower than the first threshold temperature TA1. By setting the start condition of the scavenging process for the fuel cell 20, which has higher startability in a low temperature environment than the auxiliary components, at a lower temperature than the start condition of the scavenging process for the auxiliary components, it is possible to suppress unnecessary fuel gas consumption.

In the fuel cell system 100 of the present embodiment, the temperature of the auxiliary components exhibiting a temperature lower than that of the fuel cell 20 during the period in which the fuel cell system 100 is stopped is used as the first temperature T1. The auxiliary components from which the first temperature T1 is acquired are limited to the auxiliary components that tend to exhibit a low temperature to suppress increase in the number of the first temperature sensors, so that the start condition of the scavenging process can be efficiently determined.

In the fuel cell system 100 of the present embodiment, the temperature of the gas-liquid separator 57 and the intercooler 35 is used as the first temperature T1. By using the temperature of the gas-liquid separator 57 and the intercooler 35, which tend to exhibit the lowest temperature among the auxiliary components of the fuel cell system 100, to determine the start condition of the scavenging process, the auxiliary components from which the first temperature T1 is acquired can be further limited and the start condition of the scavenging process can be determined more efficiently.

B. Second Embodiment

FIG. 3 is a flowchart showing an operation stop period scavenging process performed by the control device 60 included in the fuel cell system 100 according to a second embodiment. The operation stop period scavenging process of the second embodiment is different from the operation stop period scavenging process of the first embodiment in that steps S40, S42, S52, and S62 are not provided, and other configurations of the operation stop period scavenging process of the second embodiment are the same as those of the first embodiment. In the present embodiment, the control device 60 determines whether to perform the scavenging process during the stop period without using the temperature of the fuel cell 20 as the second temperature T2.

The control device 60 performs steps S10 to S20 as in the first embodiment, and then, acquires the temperature of the gas-liquid separator 57 as the first temperature T1 from the separator temperature sensor 59 in step S30. The control device 60 determines whether the first temperature T1 is lower than a first threshold temperature TA2 (step S32). When the first temperature T1 is equal to or higher than the first threshold temperature TA2 (S32: NO), the control device 60 stops the operation of the fuel cell system 100 (step S70), and ends the process.

When the first temperature T1 is lower than the first threshold temperature TA2 (S32: YES), the control device 60 uses the electric power of the secondary battery 40 to drive the auxiliary components to start power generation of the fuel cell 20, and starts the warm-up operation of the fuel cell 20 (step S50). The first threshold temperature TA2 may be the same temperature as the first threshold temperature TA1 in the first embodiment, or may be a temperature different from the first threshold temperature TA1. For example, the first threshold temperature TA2 may be set at a temperature lower than the first threshold temperature TA1 in consideration of the startability of the auxiliary components in a low temperature environment. By limiting the start condition of the scavenging process to a lower temperature, it is possible to suppress unnecessary warm-up operation and execution of the scavenging process. From the viewpoint of performing the warm-up operation of the fuel cell 20 in step S50, the first threshold temperature TA2 may be set at the same temperature as the second threshold temperature TB described above. After the warm-up operation is performed, the control device 60 drives the auxiliary components using the electric power generated by the fuel cell 20 to perform the scavenging process (step S60). When the completion condition of the scavenging process is satisfied, the control device 60 ends the scavenging process and stops the fuel cell system 100 (step S70) to complete the process.

In the fuel cell system 100 of the present embodiment, when the first temperature T1 is lower than the first threshold temperature TA2, the control device 60 performs the warm-up operation of the fuel cell 20 and then performs the scavenging process. By raising the temperature of the auxiliary components with the heat generated by the warm-up operation of the fuel cell 20, it is possible to enhance the scavenging property of the auxiliary components and improve the startability of the fuel cell system 100. Since the control device 60 does not use the temperature of the fuel cell 20 as the second temperature T2 for determining the start condition of the scavenging process, the process flow can be simplified.

C. Third Embodiment

FIG. 4 is a flowchart showing an operation stop period scavenging process performed by the control device 60 included in the fuel cell system 100 according to a third embodiment. The operation stop period scavenging process of the third embodiment is different from that of the first embodiment in that step S22 is provided instead of step S20, step S64 is provided instead of step S60, and steps S30 to S42 and steps S50 and S60 are not provided. Other configurations of the operation stop period scavenging process of the third embodiment are the same as those of the first embodiment. In the present embodiment, when performing the scavenging process, the control device 60 acquires the SOC of the secondary battery 40 and determines whether to cause the fuel cell 20 to generate electricity in accordance with the SOC of the secondary battery 40.

Similar to the first embodiment, the control device 60 performs step S10, and then, acquires the SOC of the secondary battery 40 and compares the SOC with a predetermined threshold value (step S22). The threshold value can be set using such an amount of electricity stored in the secondary battery 40 as to drive the auxiliary components to perform the scavenging process for a sufficient period of time in step S64, and can be set to any value, e.g., 10% to 90%. When the SOC is equal to or higher than the threshold value (S22: YES), the control device 60 omits the power generation of the fuel cell 20 and drives each auxiliary components using the electric power of the secondary battery 40 to perform the scavenging process (step S64). When the SOC is less than the threshold value (S22: NO), the control device 60 starts the power generation of the fuel cell 20 and starts the normal operation of the fuel cell 20 (step S52). The control device 60 uses the electric power generated by the fuel cell 20 to drive the auxiliary components to perform the scavenging process (step S64). For example, when the completion condition of the scavenging process such as continuation of scavenging for a predetermined period of time is satisfied, the control device 60 ends the scavenging process and stops the fuel cell system 100 (step S70) to complete the process.

In the fuel cell system 100 of the present embodiment, the control device 60 acquires the SOC of the secondary battery 40. When the SOC is sufficient, the control device 60 omits the power generation of the fuel cell 20, and uses the electric power of the secondary battery 40 to drive the auxiliary components to perform the scavenging process. When the scavenging process can be performed for a sufficient period of time using the electric power of the secondary battery 40 even during the stop period, the fuel gas consumption due to the scavenging process can be suppressed by omitting the power generation by the fuel cell 20.

D. Other Embodiments (D1) In the above embodiments, the first temperature T1 and the second temperature T2 are used for determining the start condition of the scavenging process by the control device 60. In contrast, the control device 60 may determine whether the start condition of the scavenging process is satisfied without using the first temperature T1 or the second temperature T2. Examples of the case where the start condition of the scavenging process is satisfied include: a case where the water content of the fuel cell 20 exceeds a predetermined threshold value; a case where blockage of the gas flow path due to the generated water is detected; and a case where a command signal issued through switch operation by the user or the like and commanding the scavenging process is detected.

(D2) In the second embodiment, when the control device 60 determines that the first temperature T1 is equal to or higher than the first threshold temperature TA2, the control device 60 starts the warm-up operation of the fuel cell 20 (step S50). In contrast, for example, when the startability of the auxiliary components in a low temperature environment is sufficiently high, step S50 may be omitted, or the normal operation of the fuel cell 20 may be performed instead of step S50.

(D3) In the above-described embodiments, part or all of the functions and processes implemented by software may be implemented by hardware. In addition, part or all of the functions and processes implemented by hardware may be implemented by software. Various circuits, such as an integrated circuit, a discrete circuit, and a circuit module that is a combination of those circuits, may be used as hardware.

The present disclosure is not limited to the embodiments above, and can be implemented with various configurations without departing from the scope of the present disclosure. For example, the technical features of the embodiments corresponding to the technical features in each mode described in the section of the summary may be replaced or combined appropriately to solve some or all of the above issues or to achieve some or all of the above effects. When the technical features are not described as essential in this specification, the technical features can be deleted as appropriate.

What is claimed is:

1. A fuel cell system comprising:
a fuel cell that is supplied with a reaction gas to generate electricity;
a plurality of auxiliary components used for power generation of the fuel cell;
a first temperature sensor that senses a first temperature that is a temperature of at least one of the auxiliary components; and
a control device that acquires the first temperature from the first temperature sensor, and causes the fuel cell to generate electricity when the acquired first temperature is lower than a predetermined first threshold temperature, and controls the auxiliary components using electric power generated by the fuel cell to perform a scavenging process of removing water in a flow path of the reaction gas using the reaction gas, during a stop period in which electric power is not supplied to a load from the fuel cell system.

2. The fuel cell system according to claim 1, wherein the control device performs a warm-up operation of the fuel cell with power generation by the fuel cell before the scavenging process.

3. The fuel cell system according to claim 1, further comprising a second temperature sensor that acquires a second temperature that is a temperature of the fuel cell, wherein in a case where the first temperature is lower than the first threshold temperature, the control device performs a warm-up operation of the fuel cell with power generation by the fuel cell before the scavenging process when the second temperature is lower than a predetermined second threshold temperature, and causes the fuel cell to generate electricity to perform the scavenging process without performing the warm-up operation when the second temperature is equal to or higher than the second threshold temperature.

4. The fuel cell system according to claim 3, wherein the second threshold temperature is set to a temperature lower than the first threshold temperature.

5. The fuel cell system according to claim 1, wherein the first temperature is a temperature of an auxiliary component, out of the auxiliary components, exhibiting a lower temperature than the fuel cell during the stop period.

6. The fuel cell system according to claim 1, wherein:
the auxiliary components includes at least one of a gas-liquid separator for separating liquid water contained in the reaction gas consumed by the fuel cell and a circulation pump for circulating the reaction gas to the fuel cell; and
the first temperature is a temperature of the gas-liquid separator or the circulation pump.

* * * * *